(12) United States Patent
Aaron et al.

(10) Patent No.: US 10,674,180 B2
(45) Date of Patent: Jun. 2, 2020

(54) TECHNIQUES FOR IDENTIFYING ERRORS INTRODUCED DURING ENCODING

(71) Applicant: NETFLIX, Inc, Los Gatos, CA (US)

(72) Inventors: Anne Aaron, Menlo Park, CA (US); Zhonghua Ma, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 19 days.

(21) Appl. No.: 14/622,771

(22) Filed: Feb. 13, 2015

(65) Prior Publication Data

US 2016/0241878 A1      Aug. 18, 2016

(51) Int. Cl.
*H04N 19/65* (2014.01)
*H04N 19/176* (2014.01)
*H04N 17/00* (2006.01)

(52) U.S. Cl.
CPC .......... *H04N 19/65* (2014.11); *H04N 17/004* (2013.01); *H04N 19/176* (2014.11)

(58) Field of Classification Search
CPC ............................. H04N 19/65; H04N 19/176
USPC ..................................................... 375/240.27
See application file for complete search history.

(56) References Cited

U.S. PATENT DOCUMENTS

| | | | | |
|---|---|---|---|---|
| 5,576,767 A | * | 11/1996 | Lee ...................... | H04N 19/139 375/240.14 |
| 8,102,921 B2 | * | 1/2012 | Suh ........................ | H04H 20/30 375/240.27 |
| 2002/0181408 A1 | | 12/2002 | Sirivara et al. | |
| 2006/0268980 A1 | | 11/2006 | Le Dinh et al. | |

(Continued)

FOREIGN PATENT DOCUMENTS

| | | |
|---|---|---|
| CN | 1920582 A | 2/2007 |
| EP | 1 622 395 A1 | 2/2006 |

(Continued)

OTHER PUBLICATIONS

International Search Report for application No. PCT/US2016/017376 dated Jun. 6, 2016.

(Continued)

*Primary Examiner* — Sath V Perungavoor
*Assistant Examiner* — Kristin Dobbs
(74) *Attorney, Agent, or Firm* — Artegis Law Group, LLP (57) ABSTRACT

In one embodiment of the present invention, an encode validator identifies and classifies errors introduced during the parallel chunk-based translation of a source to a corresponding aggregate encode. In operation, upon receiving a source for encoding, a frame difference generator creates a frame difference file for the source. A parallel encoder then distributes per-chunk encoding operations across machines and creates an aggregate encode. The encode validator decodes the aggregate encode and creates a corresponding frame difference file. Subsequently, the encode validator performs phase correlation operations between the two frame difference files to detect errors generated by encoding process faults (i.e., dropping a frame, etc.) while suppressing discrepancies inherent in encoding, such as those attributable to low bit-rate encoding. Advantageously, since the encode validator leverages frame difference files, this indirect verification technique enables efficient debugging of parallel encoding processes in which the complete source is unavailable for post-encode analysis.

20 Claims, 5 Drawing Sheets

(56) References Cited

U.S. PATENT DOCUMENTS

| | | |
|---|---|---|
| 2008/0143837 A1 | 6/2008 | Okamoto et al. |
| 2014/0016038 A1 | 1/2014 | Ramaswamy et al. |
| 2014/0301468 A1* | 10/2014 | Knee .................. H04N 19/176 375/240.16 |

FOREIGN PATENT DOCUMENTS

| | | |
|---|---|---|
| EP | 1 903 809 A1 | 3/2008 |
| EP | 2 408 206 A1 | 1/2012 |
| JP | 2000-506687 A | 5/2000 |
| JP | 2002-142131 A | 5/2002 |
| JP | 2008-533937 A | 8/2008 |
| JP | 2014-527778 A | 10/2014 |
| KR | 10-2008-0012354 A | 2/2008 |
| WO | 97/37322 A1 | 10/1997 |
| WO | 2006/099743 A1 | 9/2006 |
| WO | 2013/030833 A | 3/2013 |

OTHER PUBLICATIONS

Wolf, S., "A No Reference (NR) and Reduced Reference (RR) Metric for Detecting Dropped Video Frames", Fourth International Workshop on Video Processing and Quality Metrics for Consumer Electronics, Jan. 16, 2009, retrieved from, URL:http://enpub.fulton.asu.edu/resp/vpqm/vpqm09/Proceedings_VPQM09/Papersjvpqm_09_v2.pdf, 6 pages.

Borer, S., "A Model of Jerkiness for Temporal Impairments in Video Transmission", Proceedings of the 2010 Second International Workshop on Quality of Multimedia Experience (QoMEX 2010), Jun. 21, 2010, pp. 218-223.

"Objective Perceptual Video Quality Measurement Techniques for Digital Cable Television in the Presence of a Full Reference", Recommendation ITU-T A.8 procedure, J.144, Mar. 15, 2004, 156 pages.

* cited by examiner

FIGURE 4B

TECHNIQUES FOR IDENTIFYING ERRORS INTRODUCED DURING ENCODING

BACKGROUND OF THE INVENTION

Field of the Invention

Embodiments of the present invention relate generally to computer science and, more specifically, to techniques for identifying errors introduced during encoding.

Description of the Related Art

Efficiently and accurately encoding source video is essential for real-time delivery of video content. After the encoded video content is received, the source video is decoded and viewed or otherwise operated upon. Some encoding processes employ lossless compression algorithms, such as Huffman coding, to enable exact replication of the source. By contrast, to increase compression rates and/or reduce the size of the encoded video content, other encoding processes leverage lossy data compression techniques that eliminate selected information, typically enabling only approximate reconstruction of the source.

To optimize encoding time, some encoding processes parallelize the encoding work across multiple compute instances. In one approach to parallel encoding, an encoding engine decomposes the source video into individual chunks, distributes per-chunk encoding across multiple compute instances, and then configures a final compute instance to assemble the multiple encoded chunks into an aggregate encode.

While parallelizing the encoding work can significantly decrease overall decoding time compared to conventional techniques, the complexity inherent in this "divide-and-conquer" approach introduces additional opportunities for errors. For example, if the encoding engine does not assemble the encoded chunks correctly, then synchronization errors may be introduced, thereby degrading the quality of the resulting video. Notably, synchronization errors may be experienced by an audience viewer as an unacceptable and annoying lag between the video and audio components of a movie. Unfortunately, because the source video is typically unavailable after the encoding engine splits the source video into chunks, conventional verification techniques that compare the source video to the post-encode video have limited or no applicability in the parallel encoding paradigms described above. Consequently, parallel encoding engines typically do not ensure the quality of encoded videos or do not do so in an efficient, systematic fashion.

As the foregoing illustrates, what is needed in the art are more effective techniques for identifying errors introduced during encoding processes.

SUMMARY OF THE INVENTION

One embodiment of the present invention sets forth a computer-implemented method for identifying errors introduced during encoding. The method includes receiving frame difference data derived from source data, receiving aggregate encoded data derived from the source data, decoding the aggregate encoded data to generate aggregate decoded data; generating frame difference data derived from the aggregate decoded data, performing at least one phase correlation operation on the frame difference data derived from the source data and the frame difference data derived from the aggregate decoded data to generate phase correlation values, and detecting a low phase correlation error included in the aggregate encoded data based on the phase correlation values.

One advantage of the disclosed error identification techniques is that these techniques enable the verification of encoded data derived from source data irrespectively of the availability of the source data. Further, because the disclosed techniques operate on frame difference data derived from the source data instead of the source data, parallel encoding systems may be effectively debugged guided by errors identified in aggregate encoded data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

System Overview

Figure 1:
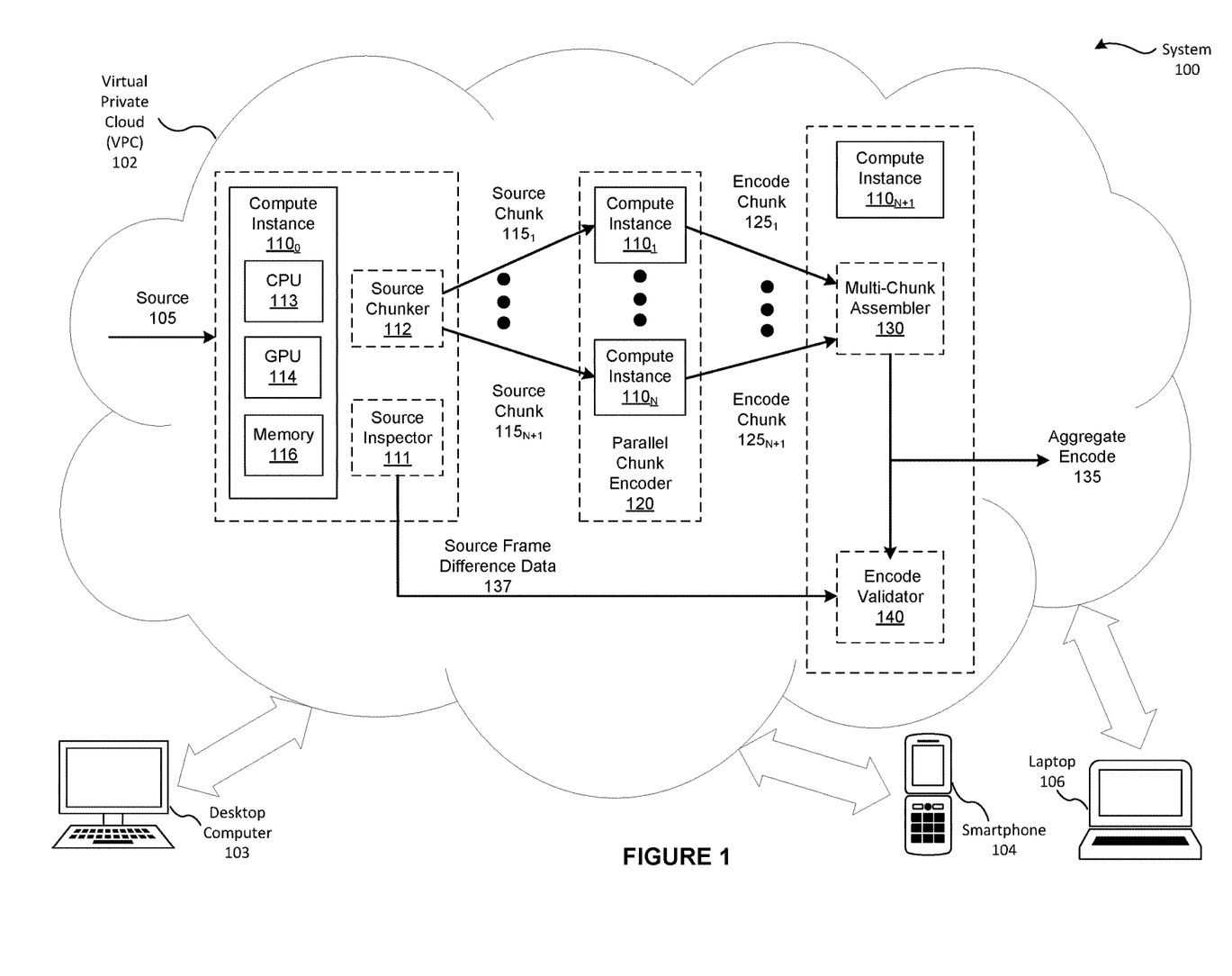
FIG. 1 is a conceptual illustration of a system configured to implement one or more aspects of the present invention.

FIG. 1 is a conceptual illustration of a system 100 configured to implement one or more aspects of the present invention. As shown, the system 100 includes a virtual private cloud (i.e., encapsulated shared resources, software, data, etc.) 102 connected to a variety of devices capable of transmitting input data and/or displaying video. Such devices include, without limitation, a desktop computer 103, a smartphone 104, and a laptop 106. In alternate embodiments, the system 100 may include any number and/or type of input, output, and/or input/output devices in any combination.

The virtual private cloud (VPC) 100 includes, without limitation, any number and type of compute instances 110. The VPC 100 receives input user information from an input device (e.g., the laptop 106), one or more compute instances 110 operate on the user information, and the VPC 100 transmits processed information to the user. The VPC 100 conveys output information to the user via display capabilities of any number of devices, such as a conventional cathode ray tube, liquid crystal display, light-emitting diode, or the like.

In alternate embodiments, the VPC 102 may be replaced with any type of cloud computing environment, such as a public or a hybrid cloud. In other embodiments, the system 100 may include any distributed computer system instead of the VPC 102. In yet other embodiments, the system 100 does not include the VPC 102 and, instead, the system 100 includes a single computing unit that implements multiple processing units (e.g., central processing units and/or graphical processing units in any combination).

As shown for the compute instance $110_0$, each compute instance 110 includes a central processing unit (CPU) 113, a graphics processing unit (GPU) 114, and a memory 116. In operation, the CPU 113 is the master processor of the compute instance 110, controlling and coordinating operations of other components included in the compute instance 110. In particular, the CPU 113 issues commands that control the operation of the GPU 114. The GPU 114 incorporates circuitry optimized for graphics and video processing, including, for example, video output circuitry. In various embodiments, GPU 114 may be integrated with one or more of other elements of the compute instance 110. The memory 116 stores content, such as software applications and data, for use by the CPU 113 and the GPU 114 of the compute instance 110.

In general, the compute instances 110 included in the VPC 102 are configured to implement one or more applications. More specifically, the compute instances 110 included in the VPC 102 are configured to encode a source 105, such as a video file. As shown, compute instance $110_0$ is configured as a source inspector 111 and a source chunker 112, compute instances $110_1$-$110_N$ are configured as a parallel chunk encoder 120, and compute instance $110_{N+1}$ is configured as a multi-chunk assembler 130 and a encode validator 140.

The source chunker 112 receives the source 105 and breaks the source into N different source chunks 115, where N corresponds to the number of compute instances 110 included in the parallel chunk encoder 120. Subsequently, the source chunker 112 routes each of the source chunks $115_1$-$115_N$ to a different one of the compute instances $110_1$-$110_N$, and the compute instances 110 each perform encoding operations to create corresponding encode chunks $125_1$-$125_N$. The multi-chunk assembler 130 then combines the encode chunks $125_1$-$125_N$ into an aggregate encode 135.

Not only do concurrent encoding operations reduce the time required to encode the source 105, but distributing the encoding operations across multiple compute instances 110 decreases the impact of any single compute instance 110 on the encoding process. For example, if the compute instance $110_N$ fails, then the parallel chunk encoder 120 reprocesses only the single encode chunk $125_N$. However, each of the processes of breaking the source 105, distributing the source chunks 115, encoding the source chunks 115, and reassembling the encode chunks 125 into the aggregate encode 135 are susceptible to errors. For example, an error in reassembly of the encode chunks 125 may cause one or more frames of the source 105 to be dropped in the aggregate encode 135, potentially leading to noticeable synchronization errors when the aggregate encode 135 is decoded.

For this reason, the compute instance $110_{N+1}$ is also configured as an encode validator 140. As persons skilled in the art will recognize, the complete source 105 is unavailable to the parallel chunk encoder 120, the multi-chunk assembler 130, and the encode validator 140. Consequently, the encode validator 140 does not implement conventional verification techniques that compute and compare metrics such as peak signal-to-noise ratio (PSNR) for both the source 105 and the aggregate encode 135. Instead, the source inspector 110 and encode validator 140 work together to indirectly compare the source 105 to the aggregate encode 135. In alternate embodiments, the compute instance $110_{N+1}$ is configured as the multi-chunk assembler 130, but not as the encode validator 140. In such embodiments, a different one of the compute instances 110 (e.g., the compute instance $110_{N+2}$) is configured as the encode validator 140.

As part of processing the source 105, the source inspector 111 calculates the average luma difference between each pair of adjacent frames and stores the frame difference values as source frame difference data 137. A small frame difference value indicates that two adjacent frames are relatively similar—reflecting a static scene or a scene with few motions. By contrast, a large frame difference value indicates a sharp change between two adjacent frames, typically reflecting large motions or scene cuts (i.e., scene changes). The source inspector 111 may generate the source frame difference data 137 in any technically feasible fashion.

Correspondingly, the encode validator 140 decodes the aggregate encode 135, and then calculates the average luma difference between each pair of adjacent frames, generating "encode frame difference data." Subsequently, the encode validator 140 leverages the source frame difference data 137 and the encode frame difference data to validate the aggregate encode 135 without accessing the source 105. More specifically, the encode validator 140 performs phase correlation operations between the source frame difference data 137 and the encode frame difference data. These phase correlation operations enable the encode validator 140 to detect unexpected low phase correlation errors in the aggregate encode 135 that are attributable to frame loss and encoding misbehaviors.

Notably, the encode validator 140 also uses the phase correlation operations to weed-out "false" errors. More specifically, the encode validator 140 identifies a variety of scenarios that indicate isolated errors that are accepted as part of the encoding process, and then prunes these errors. These false errors include isolated blocks of frames with artifacts attributable to the lossy data compression techniques implemented in the parallel chunk encoder 120 and/or bad encoder rate control. Advantageously, discriminating between true (i.e., unintentional) errors introduced by the encoding process and false (i.e., anticipated) errors, enables the encode validator 140 to optimally guide triage of the aggregate encode 135 and debug of the source chunker 112, the parallel chunk encoder 120, and the multi-chunk assembler 130.

Identifying "True" Errors

Figure 2:
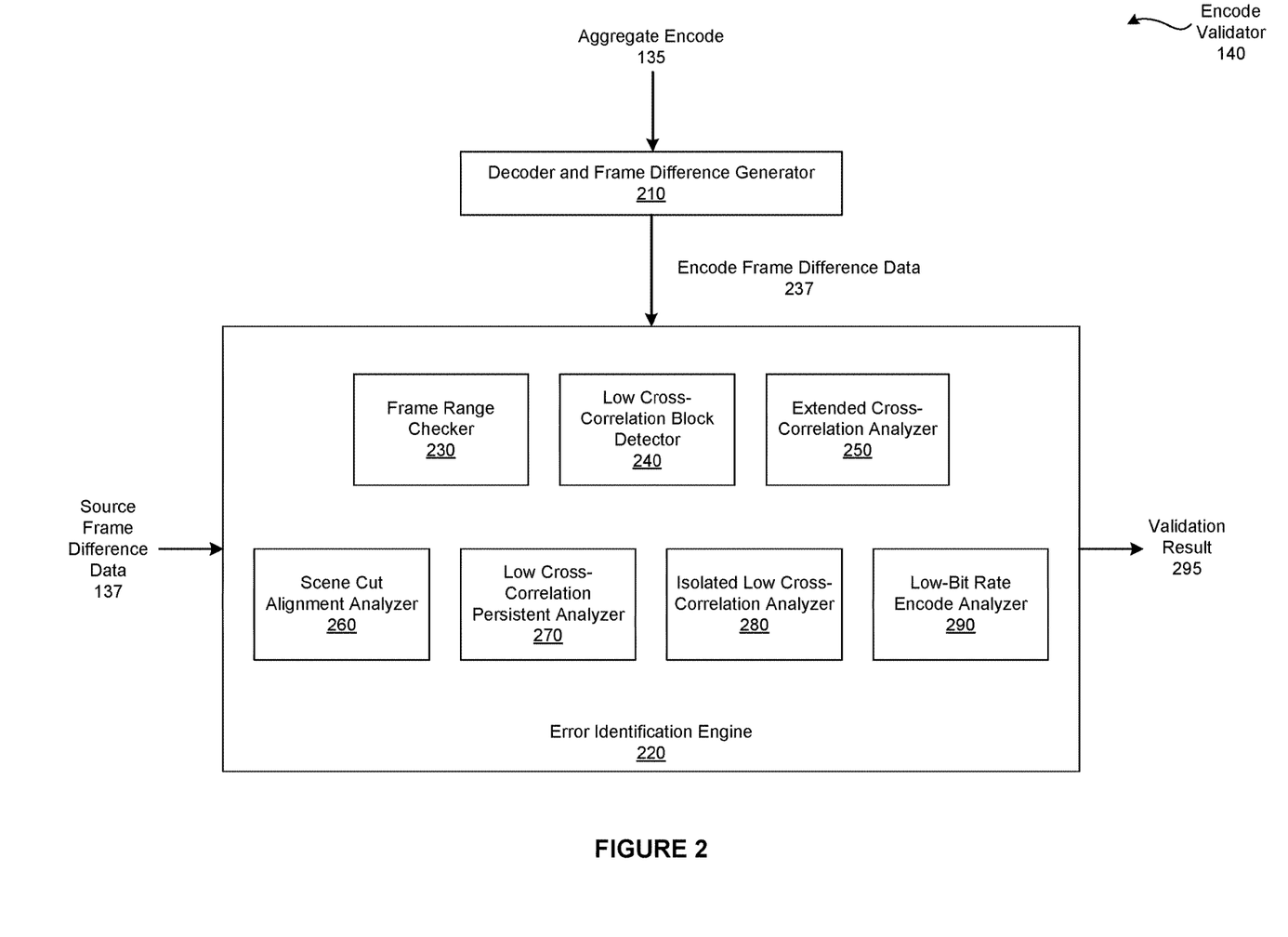
FIG. 2 is a block diagram illustrating the encode validator of FIG. 1, according to one embodiment of the present invention.

FIG. 2 is a block diagram illustrating the encode validator 140 of FIG. 1, according to one embodiment of the present invention. As shown, the encode validator 140 includes, without limitation, a decoder and frame difference generator 210 and an error identification engine 220.

Upon receiving the aggregate encode 135, the decoder and frame difference generator 210 decodes the aggregate encode 135 and then generates encode frame difference data 237. As previously disclosed herein, the encode frame difference data 237 is the average luma difference between each pair of adjacent frames in the decoded aggregate encode 135. The decoder and frame difference generator 210 may generate the encode frame difference data 237 in any technically feasible fashion. In some embodiments, the same algorithm may be used to generate both the source frame difference data 137 and the encode frame difference data 237.

As shown, the error identification engine 220 receives both the encode frame difference data 237 and the source frame difference data 137. Notably, the error identification engine 220 receives neither the source 105 nor the aggregate encode 135. Instead of relying on direct comparisons, the error identification engine 220 identifies errors in the aggregate encode 135 indirectly based on comparisons between the encode frame difference data 237 and the source frame difference data 137.

In general, the error identification engine 220 is designed to indirectly identify errors in the aggregate encode 135, prune any false errors, and then generate a validation result 295 that reflects the number and/or type of the remaining (i.e., true) errors, such as "good encode" or "bad encode." The error identification engine 220 includes, without limitation, a frame range checker 230, a low cross-correlation block detector 240, an extended cross-correlation analyzer 250, a scene cut alignment analyzer 260, a low cross-correlation persistent analyzer 270, an isolated low cross-correlation analyzer 280, and a low-bit rate encode analyzer 290.

In alternate embodiments, the error identification engine 220 may identify errors in any technically feasible manner that is based on the encode frame difference data 237 and the source frame difference data 137. Further, the error identification engine 220 may combine any number of validation techniques in any order to determine the validation result 295. For example, in some embodiments, the scene cut alignment analyzer 260 and associated functionality is omitted. The validation functionality may be combined or split into any number of individual components, for example, the low cross-correlation persistent analyzer 270 and the isolated low cross-correlation analyzer 280 may be combined into a single "low cross-correlation analyzer."

In general, the error identification engine 220 may identify errors by performing any type and number of phase correlation operations. For example, in alternate embodiments, the components of the encode validator 140 may be modified to replace or augment the cross-correlation operations with additional types of phase correlation operations.

In other embodiments, the source inspector 111 is modified to include additional information in the source frame difference data 137, such as chroma information. Similarly, the decoder and frame difference generator 210 includes chroma information in the encode frame difference data 237. In such embodiments, the error identification engine 220 is extended to include error analysis based on the chroma information. For example, the error identification engine 220 may generate a color histogram based on both the luma and chroma information, and then analyze the color histogram to identify errors attributable to color shifting and chroma coding artifacts.

The error identification engine 220 guides an error detection and pruning process, with different algorithms implemented in different components. Advantageously, the error identification engine 220 is configured to short-circuit the evaluation process upon reaching a conclusion regarding the existence of "true" errors in the aggregate encode 135, avoiding unnecessary use of compute resources.

First, the error identification engine 220 executes the frame range checker 230. The frame range checker 230 calculates the difference between the frame count of the source frame difference data 137 and the frame count of the encode frame difference data 230. If this frame count difference exceeds a configurable threshold, then the error identification engine 220 concludes that a true error exists, the error identification engine 220 emits the validation result 295 of "bad encode," and the error identification engine 220 successfully terminates. In such a scenario, the error identification engine 220 short-circuits the evaluation process, invoking none of the low cross-correlation block detector 240, extended cross-correlation analyzer 250, the scene cut alignment analyzer 260, the low cross-correlation persistent analyzer 270, the isolated low cross-correlation analyzer 280, and the low-bit rate encode analyzer 290.

The frame range checker 230 may implement any configurable threshold. For example, often some frame loss occurs at the end of aggregate encode 235 (i.e., the black frames at the end). Since such a frame loss does not perceptively impact the quality of the aggregate encode 235, in some embodiments, the configurable threshold is set to ten frames.

If the frame count difference does not exceed the configurable threshold, then the error identification engine 220 continues the analysis, and invokes the low cross-correlation block detector 240. The low cross-correlation block detector 240 computes the block-by-block cross-correlation between the source frame difference data 137 and the encode frame difference data 237. The number of frames included in each block is consistent across the blocks and may be determined in any technically feasible fashion. In some embodiments, as a trade-off between accommodating local video content variation and detecting scene cut detection, the block size is set to 1000 frames.

As persons skilled in the art will recognize, cross-correlation is a robust and effective tool for detecting phase shift between two signal sources. In general, for a given block (set of frames), if the source frame difference data 137 and the encode frame difference data 230 are relatively similar, then the video content is likely to be relatively similar—the cross-correlation between the two blocks is high. By contrast, if the source frame difference data 137 and the encode frame difference data 230 differ dramatically, then the video content of the aggregate encode 135 is likely to be out-of-synchronization with the video content of the source 105. In such a scenario, the cross-correlation between the two blocks is relatively low, often reflecting a frame drop during the encoding process.

After computing the cross-correlation data, the low cross-correlation block detector 240 generates a list of relatively low cross-correlation blocks. For each block, the low cross-correlation block detector 240 evaluates the cross-correlation between the source frame difference data 137 and the encode frame difference data 230. If the cross-correlation of the block is lower than a predetermined threshold, then the low cross-correlation block detector 240 adds the block to the list of low cross-correlation blocks. The threshold may be set to any value based on any heuristic. In some embodiments, the threshold is set to 0.78. In other embodiments, the threshold is set to a higher or lower value.

Before proceeding to the next evaluation phase, the error identification engine 220 determines whether the list of low cross-correlation blocks is empty (i.e., the low cross-correlation block detector 240 identified no low cross-correlation blocks). If the error identification engine 220 determines that there are no low cross-correlation blocks, then the error identification engine 220 emits the validation result 295 of "good encode," and the error identification engine 220 successfully terminates. In such a scenario, the error identification engine 220 short-circuits the evaluation process, invoking none of the extended cross-correlation analyzer 250, the scene cut alignment analyzer 260, the low cross-correlation persistent analyzer 270, the isolated low cross-correlation analyzer 280, and the low-bit rate encode analyzer 290.

Otherwise, the list of low cross-correlation blocks is evaluated by the extended cross-correlation analyzer 250 as part of identifying synchronization errors. For each low cross-correlation block, the extended cross-correlation analyzer 250 imposes small phase shifts between the source frame difference data 137 and the encode frame difference data 237 for a set of frames surrounding the low cross-correlation block. The extended cross-correlation analyzer 250 then computes the corresponding shifted cross-correlations and determines whether the match between the block for the source 105 and the aggregate encode 135 is better with the imposed phase shift than without the phase shift.

If the extended cross-correlation analyzer 250 determines that the shifted cross-correlation is significantly better than the cross-correlation, then the extended cross-correlation analyzer 250 determines that the aggregate encode 135 is out-of-sync at the block. Upon identifying such an out-of-sync block, the extended cross-correlation analyzer 250 considers the aggregate encode 235 to include true errors, the error identification engine 220 emits the validation result 295 of "bad encode," and the error identification engine 220 successfully terminates.

By contrast, if the extended cross-correlation analyzer 250 determines that the original cross-correlation is significantly better than the shifted cross-correlations, then the extended cross-correlation analyzer 250 determines that the aggregate encode 135 is in-sync at the block, and removes the block from the low cross-correlation list.

The extended cross-correlation analyzer 250 may implement the shifted cross-correlation comparison in any technically feasible fashion. In one embodiment, the extended cross-correlation analyzer 250 implements the following algorithm:

For a given low cross-correlation block in the source frame difference data 137, the extended cross-correlation analyzer 250 shifts the block against the corresponding encode frame difference data 237 within a preset phase window (e.g., [−5, +5]). The extended cross-correlation analyzer 250 then performs the analysis on the cross correlations per phase shift as follows:
1) If a maximum is found by shifting the block in the encode frame difference data 237 away from the original location, and the maximum is significant larger than all other cross-correlation values, then the current block is identified as "out-of-sync". The analysis is terminated and the validation result 295 of "bad encode" is issued.
2) Otherwise, if the maximum still corresponds to the original location (i.e., no shift), and all other values produced by shifting stay significant lower than the maximum, then the extended cross-correlation analyzer 250 considers the block "in sync" and removes the block from the list of low cross-correlation blocks.

Note that a correlation value is "significantly" distinct from the others if, from a statistical point of view, the correlation value is located more than twice times standard-deviation away from the data center.

After the extended cross-correlation analyzer 250 completes extended cross-correlation analysis for each of the low cross-correlation blocks, the error-identification engine 220 determines whether there are any low cross-correlation blocks remaining in the low cross-correlation block list. If the error identification engine 220 determines that there are no remaining low cross-correlation blocks, then the error identification engine 220 emits the validation result 295 of "good encode," and the error identification engine 220 successfully terminates. In such a scenario, the error identification engine 220 short-circuits the evaluation process, invoking none of the scene cut alignment analyzer 260, the low cross-correlation persistent analyzer 270, the isolated low cross-correlation analyzer 280, and the low-bit rate encode analyzer 290.

By contrast, if the list of low cross-correlation blocks still includes any low cross-correlation blocks, then the scene cut alignment analyzer 260 identifies any errors that are rendered essentially imperceptible by scene cuts. In general, scene changes and scene cuts represent critical phase information in video sequences. As persons skilled in the art will recognize, if a scene change/cut in the aggregate encode 135 is well-aligned with the scene change/cut in the source 105, the images immediately before that scene change/cut are typically in-sync. In general, the scene cut alignment analyzer 260 examines the source frame difference data 137 and the encode frame difference data 237 to determine the scene-cut alignment. The scene cut alignment analyzer 260 then removes any low-correlation blocks immediately prior to a scene cut from the list of low-correlation blocks—pruning false errors. In one embodiment, the scene cut alignment analyzer 260 implements the following algorithm:

1) Only those "significant" scene changes/cuts in the source 105 and the aggregate encode 135 are indirectly identified for alignment analysis. A scene cut/change is considered "significant" when (1) the corresponding frame difference data is a large value (e.g., $>=15$) and (2) the frame difference data for the current frame is significantly larger than the frame difference data for the frame immediately in front of the current frame (e.g., $>=5$ in magnitude).
2) If a significant scene cut/change is indirectly determined to be aligned between the source 105 and the aggregate encode 135, then only the low correlation block immediately in front of the aligned scene cut/change is considered "in-sync" and removed from the list of low cross-correlation blocks.

If the list of low cross-correlation blocks is now empty, then the error identification engine 220 emits the validation result 295 of "good encode," and the error identification engine 220 successfully terminates, efficiently short-circuiting the evaluation process. Often, any remaining low cross-correlation blocks represent a significant amount of low visual similarities between the source 105 and the aggregate encode 135 attributable to one of:
1) The absence of sharp scene changes or temporal patterns in the video sequence, which makes the block-by-block cross-correlation less sensitive to any temporal shift and reduces the effectiveness of the scene-cut alignment check.
2) The presence of noticeable coding artifacts over the aggregate encode 135, which, when extending over a period of time, may significantly reduce the structure correlation between the source 105 and the aggregate encode 135, thus rendering both extended cross-correlation and scene-cut alignment analysis less reliable.

The low cross-correlation persistent analyzer 270 enables error detection for these two scenarios. The low cross-correlation persistent analyzer 270 implements heuristics based on two empirical observations:
1) if a low cross-correlation block is out-of-sync (i.e, due to frame loss), then the lack of synchronization often lasts for a certain number of blocks until reaching the next in-sync chunk in sequence.

2) If a low cross-correlation block suffers severe coding degradation, then such degradation often prevails until the end of current chunk.

In operation, the low cross-correlation persistent analyzer 270 scans through the remaining blocks in the list of low cross-correlation blocks and identifies sequences of adjacent low cross-correlation blocks. If any of the sequences of adjacent low cross-correlation blocks includes more than a pre-determined threshold of blocks (e.g., 4), then the low cross-correlation persistent analyzer 270 determines that the aggregate encode 235 is flawed. The error identification engine 220 then returns a validation result 295 of "bad encode" and terminates successfully, without performing any additional error analysis.

The isolated low cross-correlation analyzer 280 is configured to deterministically identify errors corresponding to a variety of complicated scenarios, including the following scenarios:

1) A frame was lost in the middle of an encoding chunk or at the end of the video sequence.
2) A frame was lost during a scene dissolve/fade-in/fade-out.
3) Noticeable coding artifacts were introduced during camera panning and/or zooming.
4) Temporal video quality degradation occurred as a consequence of bad encoder rate control.

In operation, the isolated low cross-correlation analyzer 170 distinguishes between false errors and true errors based on a statistical hypothesis test. In particular, the isolated low cross-correlation analyzer 170 applies the Grubbs test to the list of low cross-correlation blocks and identifies outliers based on the distribution of the cross-correlation data. In one embodiment, the isolated cross-correlation analyzer 170 considers a low cross-correlation block with a correlation value outside of a 95% confidence zone as an "outlier". If the isolated cross-correlation analyzer 170 determines that the total number of outliers is less than a pre-determined maximum (e.g., 3), then the isolated cross-correlation analyzer 170 considers the aggregate encode 135 to be a normal/good video with marginal code artifacts. In operation, if the isolated cross-correlation analyzer 170 determines that the aggregate encode 135 is "normal," then the error identification engine 220 emits the validation result 295 of "good encode," and the error identification engine 220 successfully terminates. In such a scenario, the error identification engine 220 short-circuits the evaluation process and does not invoke the low-bit rate encode analyzer 290.

The low-bit rate encode analyzer 290 performs a bit-rate assessment to determine whether the remaining blocks in the list of low cross-correlation blocks are likely attributable to a low encoding bit-rate. In particular, if the encoding bit-rate is relatively low (e.g., <=500 kbps, encompassing most of low-rate H263, H264, and VC1 encodes), then the low-bit rate encode analyzer 290 considers the aggregate encode 135 to be "normal"—with artifacts of the low encoding bit-rate. Otherwise, the low-bit rate encode analyzer 290 considers the aggregate encode 135 to be flawed.

If the low-bit rate encode analyzer 290 determines that the aggregate encode 135 is "normal," then the error identification engine 220 emits the validation result 295 of "good encode." If the low-bit rate encode analyzer 290 determines that the aggregate encode 135 is flawed, then the error identification engine 220 emits the validation result 295 of "bad encode." Irrespective of the result obtained from the low-bit rate encode analyzer 290, the error identification engine 220 then successfully terminates.

Figure 3:
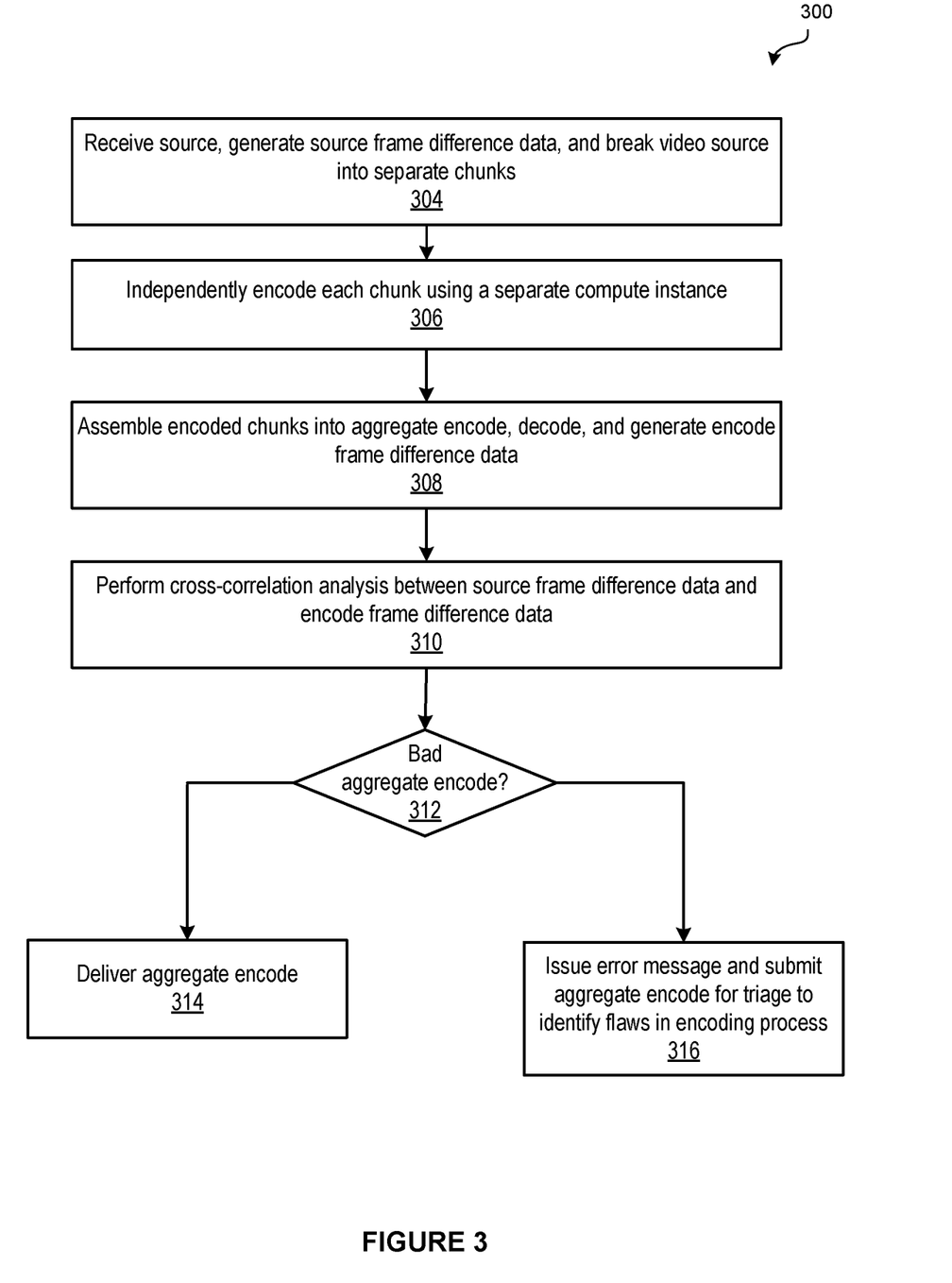
FIG. 3 is a flow diagram of method steps for generating a verified, aggregate encode of a video source, according to one embodiment of the present invention.

FIG. 3 is a flow diagram of method steps for generating a verified, aggregate encode of a video source, according to one embodiment of the present invention. Although the method steps are described with reference to the systems of FIGS. 1-2, persons skilled in the art will understand that any system configured to implement the method steps, in any order, falls within the scope of the present invention.

As shown, a method 300 begins at step 304, where the source inspector 111 and the source chunker 112 receive the source 105. The source inspector 111 generates the source frame difference data 137 and the source chunker 112 decomposes the source 105 into the source chunks 115. At step 306, the parallel chunk encoder 120 distributes each of the source chunks 115 to a separate compute instance 110 included in the parallel chunk encoder 120. Each of these compute instances 110 then generates a corresponding encode chunk 125. In alternate embodiments, the parallel chunk encoder 120 may distribute the source chunks 115 in any technically feasible fashion that enables concurrent processing of at least two of the source chunks 115. For example, the parallel chunk encoder 120 may split the source chunks 115 between two of the compute instances 110 included in the parallel chunk encoder 120.

At step 308, the multi-chunk assembler 130 assembles the encode chunks 125 into the aggregate encode 135. The encode validator 140 then decodes the aggregate encode 135 and generates the encode frame difference data 237 (i.e., frame difference data for the decoded aggregate encode).

At step 310, the error identification engine 220 included in the encode validator 140 performs various cross-correlation operations between the source frame difference data 137 and the encode frame difference data 237. These cross-correlation operations are designed to identify "true" errors attributable to flaws in the encoding process without flagging "false" errors that are expected artifacts of the lossy compression algorithm. Based on the identified errors, the encode validator 140 generates the validation result 295 for the aggregate encode 135. In general, the encode validator 140 and the error identification engine 220 may perform any number and type of cross-correlation operations in addition to other operations, in any combination, in any order, and in any technically feasible fashion. For example, in some embodiments, the encode validator 140 (including the error identification engine 220) performs the method steps outlined below in conjunction with FIGS. 4A-4B.

At step 312, the encode validator 140 determines whether the validation result 295 reflects a "good encode." If, at step 312, if the encode validator 140 determines that the validation result 295 reflects a "good encode," then this method proceeds to step 314. At step 314, the virtual private cloud (VPC) 102 that includes the encode validator 140 is configured to deliver the aggregate encode 135 to designated users for consumption (e.g., viewing), and the method 300 ends.

If, at step 312, the encode validator 140 determines that the validation result 295 reflects a "bad encode," then this method proceeds to step 316. At step 316, the encode validator 140 issues an error message indicating that the aggregate encode 135 includes "true" errors, and the method 300 ends. As part of step 316, the encode validator 140 optionally submits the aggregate encode 135 for triage to identify flaws in the encoding process (i.e., the source chunker 112, the parallel chunk encoder 120, and the multi-chunk assembler 130). Advantageously, because the encode validator 140 weeds-out false errors prior to determining the validation result 295, debugging work may be optimally focused on analyzing the root-cause of true flaws as opposed to unproductively tracing expected artifacts attributable to the implemented compression algorithm.

Figure 4A:
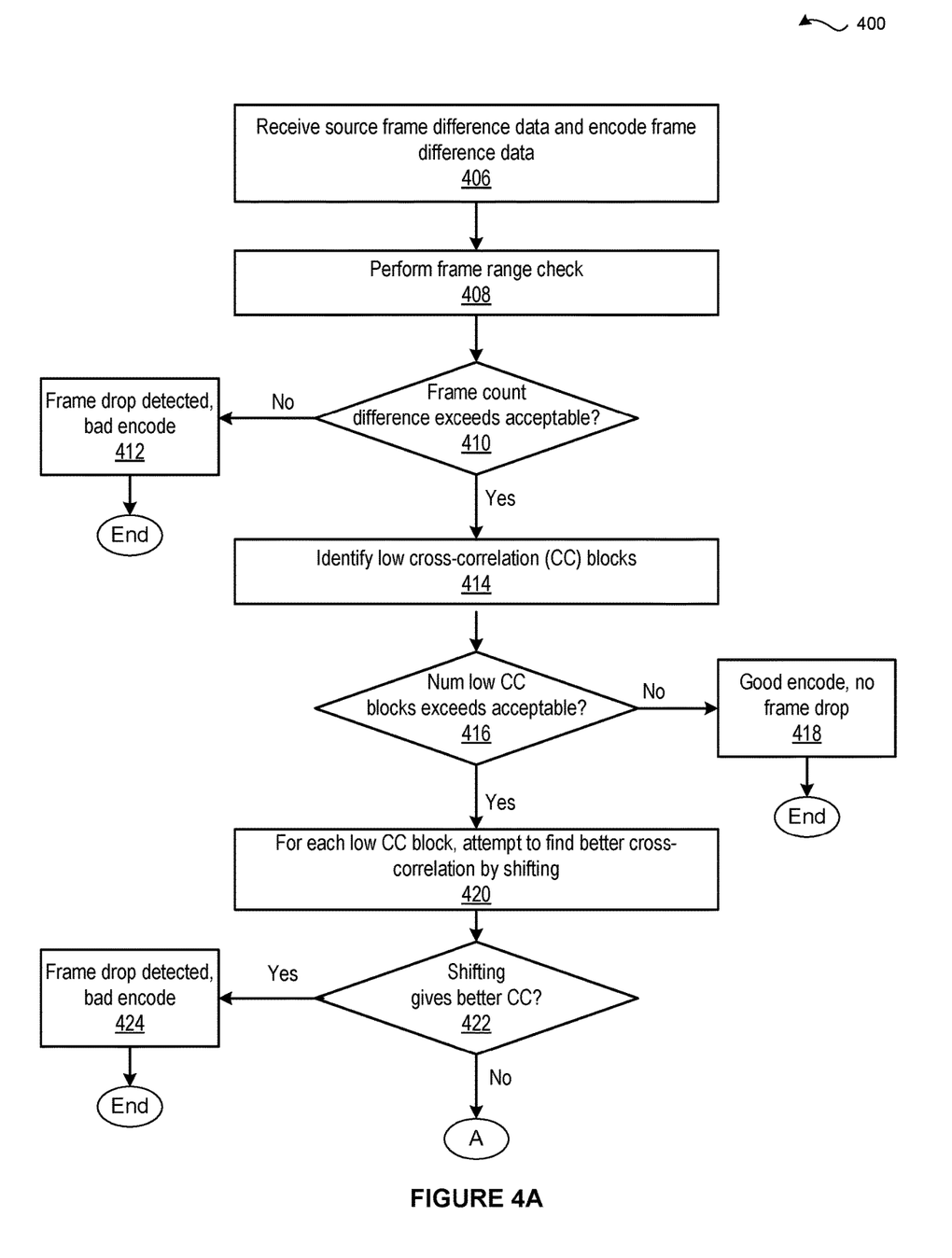
FIGS. 4A-4B set forth a flow diagram of method steps for identifying and classifying errors while encoding a video source, according to one embodiment of the present invention.
Figure 4B:
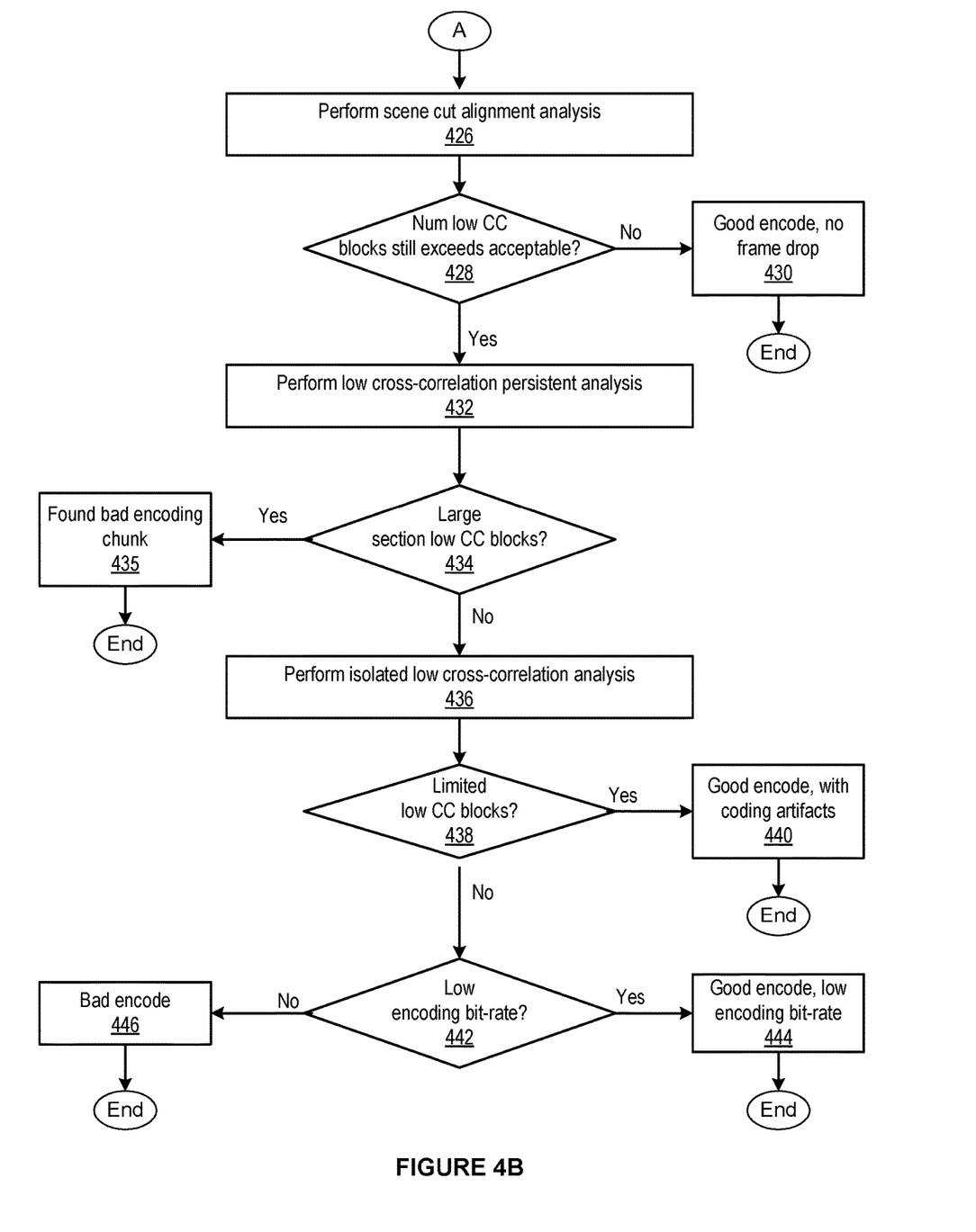

FIGS. 4A-4B set forth a flow diagram of method steps for identifying and classifying errors while encoding a video source, according to one embodiment of the present invention. Although the method steps are described with reference to the systems of FIGS. 1-2, persons skilled in the art will understand that any system configured to implement the method steps, in any order, falls within the scope of the present invention.

As shown, a method 400 begins at step 406, where the encode validator 140 receives the source frame difference data 137 and the encode frame difference data 237. The source frame difference data 137 is the average luma difference between each pair of adjacent frames in the source 105, and the encode frame difference data 237 is the average luma difference between each pair of adjacent frames in the decoded aggregate encode.

At step 408, the frame range checker 230 calculates the difference between the frame count of the source frame difference data 137 and the frame count of the encode frame difference data 230. At step 410, the frame range checker 230 determines whether the calculated frame count difference exceeds a configurable threshold. If, at step 410, the frame range checker 230 determines that the calculated frame count difference exceeds a configurable threshold, then the frame range checker 230 concludes that the frame count difference is unacceptable, and the method 400 proceeds to step 412. At step 412, the error identification engine 220 emits the validation result 295 of "frame drop detected, bad encode," and the method 400 ends.

If, at step 410, the frame range checker 230 determines that the calculated frame count difference does not exceed a configurable threshold, then the frame range checker 230 concludes that the frame count difference is acceptable, and the method 400 proceeds to step 414. At step 414, the low cross-correlation block detector 240 computes the block-by-block cross-correlation between the source frame difference data 137 and the encode frame difference data 237 and generates a list of relatively low cross-correlation blocks. More specifically, for each block, the low cross-correlation block detector 240 compares the cross-correlation between the source frame difference data 137 and the encode frame difference data 230. If the cross-correlation of the block is lower than a predetermined threshold, then the low cross-correlation block detector 240 adds the block to the list of low cross-correlation blocks.

At step 416, the error identification engine 220 compares the number of low cross-correlation blocks (i.e., then number of blocks included in the list of low cross-correlation blocks) to an acceptable number of low cross-correlation block. If, at step 416, the error identification engine 220 determines that the number of low cross-correlation blocks does not exceed the acceptable number of low cross-correlation blocks, then the method 400 proceeds to step 418. At step 418, the error identification engine 220 emits the validation result 295 of "good encode, no frame drop" and the method 400 ends.

If, at step 416, the error identification engine 220 determines that the number of low cross-correlation blocks exceeds the acceptable number of low cross-correlation blocks, then the method 400 proceeds to step 420. At step 420, the extended cross-correlation analyzer 250 evaluates each of the low cross-correlation blocks as part of identifying synchronization errors. For each low cross-correlation block, the extended cross-correlation analyzer 250 imposes small phase shifts between the source frame difference data 137 and the encode frame difference data 237 for a set of frames surrounding the low cross-correlation block.

For each of the low cross-correlation blocks, if the extended cross-correlation analyzer 250 determines that the shifted cross-correlation is significantly better than the cross-correlation, then the extended cross-correlation analyzer 250 considers the aggregate encode 135 to be out-of-sync at the block. At step 422, the extended cross-correlation analyzer determines whether the aggregate encode 135 is out-of-sync at any of the low cross-correlation blocks. If at step 422, the extended cross-correlation analyzer determines that the aggregate encode 135 is out-of-sync at any of the low cross-correlation blocks, then the method 400 proceeds to step 424. At step 424, the error identification engine 220 emits the validation result 295 of "frame drop detected, bad encode," and the error identification engine 220 successfully terminates.

If, at step 422, the extended cross-correlation analyzer 250 determines that none of the shifting operations produces a significantly improved cross-correlation, then the method 400 proceeds to step 426. In alternate embodiments, to increase the efficiency of the validation process, the extended cross-correlation analyzer 250 may prune the list of low cross-correlation blocks based on the shifted cross-correlation analysis. The extended cross-correlation analyzer 250 may implement this pruning in any technically feasible fashion, such as the algorithm detailed in conjunction with FIG. 2.

At step 426, the scene cut alignment analyzer 260 identifies any errors that are rendered essentially imperceptible by scene cuts, and removes the associated blocks from the list of low cross-correlation blocks. More specifically, the scene cut alignment analyzer 260 identifies scene cuts based on the source frame difference data 137 and the encode frame difference data 237. Subsequently, the scene cut alignment analyzer 260 identifies any low-correlation blocks that are temporally located immediately prior to a scene cut, and then removes the identified blocks from the list of low-correlation blocks.

At step 428, the error identification engine 220 compares the number of "remaining" low cross-correlation blocks (i.e., then number of blocks still included in the list of low cross-correlation blocks) to the acceptable number of low cross-correlation blocks. If at step 428, the error identification engine 220 determines that the number of remaining low cross-correlation blocks does not exceed the acceptable number of low cross-correlation blocks, then the method 400 proceeds to step 430. At step 430, the error identification engine 220 emits the validation result 295 of "good encode, no frame drop" and the method 400 ends.

If, at step 428, the error identification engine 220 determines that the number of remaining low cross-correlation blocks exceeds the acceptable number of low cross-correlation blocks, then the method 400 proceeds to step 432. At step 432, the low cross-correlation persistent analyzer 270 scans through the remaining blocks in the list of low cross-correlation blocks, identifying sequences of adjacent low cross-correlation blocks. At step 434, the low cross-correlation persistent analyzer 270 determines whether any of the identified sequences of adjacent low cross-correlation blocks includes more than a pre-determined threshold of blocks.

If, at step 434, the low cross-correlation persistent analyzer 270 determines that any of the identified sequences of adjacent low cross-correlation blocks includes more than the pre-determined threshold of blocks, then the low cross-correlation persistent analyzer 270 concludes that the aggregate encode 235 is flawed, and the method 400 proceeds to step 435. At step 435, the error identification engine 220 returns a validation result 295 of "found bad encoding chunk" and the method 400 ends.

If, at step 434, the low cross-correlation persistent analyzer 270 determines that none of the identified sequences of adjacent low cross-correlation blocks includes more than the pre-determined threshold of blocks, then the method 400 proceeds to the step 436. At step 436, the isolated low cross-correlation analyzer 170 distinguishes between false errors and true errors based on a statistical hypothesis test. In particular, the isolated low cross-correlation analyzer 170 applies the Grubbs test to the list of low cross-correlation blocks and identifies outliers based on the distribution of the cross-correlation data. At step 438, the low cross-correlation persistent analyzer 270 determines the extent of the low cross-correlation blocks based on the total number of outliers. If, at step 438, the low cross-correlation persistent analyzer 270 determines that the extent of the low cross-correlation blocks is limited, then the method 400 proceeds to step 440. At step 440, the error identification engine 220 emits the validation result 295 of "good encode, with coding artifacts" and the method 400 ends.

At step 438, if the low cross-correlation persistent analyzer 270 determines that the extent of the low cross-correlation blocks is not sufficiently limited, then the method 400 proceeds to step 442. At step 442, the low-bit rate encode analyzer 290 compares the encoding bit-rate to a predetermined threshold. If, at step 442, the low-bit rate encode analyzer 290 determines that the encoding bit-rate is lower than the predetermined threshold, then the method 400 proceeds to step 444. At step 444, the error identification engine 220 emits the validation result 295 of "good encode, low encoding bit-rate" and the method 400 ends.

If, at step 442, the low-bit rate encode analyzer 290 determines that the encoding bit-rate is not lower than the predetermined threshold, then the method 400 proceeds to step 444. At step 444, because the list of low cross-correlation blocks is not empty, the error identification engine 220 emits the validation result 295 of "bad encode" and the method 400 ends.

In sum, the disclosed techniques may be used to efficiently and correctly identify errors unintentionally introduced during encoding. In operation, prior to encoding a source, a source inspector creates frame difference data for the source and a source chunker decomposes the source into chunks. A parallel chunk encoder then processes the chunks substantially in parallel across multiple compute instances, and a multi-chunk assembler assembles an aggregate encode from the encoded chunks. An encode validator receives both the aggregate encode and the frame difference data for the source. After decoding the aggregate encode, the encode validator generates frame difference data for the aggregate encode (i.e., the frame difference data for the decoded aggregate encode).

Subsequently, the encode validator performs cross-correlation operations between the frame difference data for the source and the frame difference data for the aggregate encode. The encode validator implements a variety of algorithms designed to identify errors attributable to flaws in the encoding process while suppressing errors that are expected artifacts of the encode, such as poor translations due to low bit-rate encoding. In general, the encode validator may implement any number of error-detection and/or false error-suppression algorithms in any order. As part of this discriminating error detection, the encode validator identifies a list of low cross-correlation blocks and then prunes the list, removing low cross-correlation blocks that do not significantly contribute to perceptible synchronization errors. For instance, blocks immediately preceding scene cuts do not lead to persistent synchronization issues and, consequently, the encode validator considers these "false" errors.

Advantageously, unlike conventional encode verification techniques, the frame difference based techniques disclosed herein enable verification of aggregate encodes without access to the original source files. Often, the parallel encoder is implemented across a number of compute instances—different compute instances independently encode each chunk and a final compute instance assembles the chunks and verifies the encoding. Although performing encoding in this divide-and-conquer approach decreases the encoding time, the likelihood that the final aggregate encode may include unexpected errors is increased compared to conventional techniques that do not break apart the source. The techniques outlined herein enable efficient detection of errors (e.g., incorrect assembly of the encoded chunks into the aggregate encode) that are attributable to flaws in the encoding process. Further, because the encode validator implements a variety of sophisticated comparisons algorithms to identify errors for further debugging without flagging "expected" errors, the encode validator reduces the work required to triage aggregate encodes and debug the source chunker, the parallel chunk encoder, and the multi-chunk assembler.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for identifying errors introduced during encoding, the method comprising:
   receiving frame difference data derived from source data by determining, for each source frame included in a plurality of source frames of the source data, a difference between a characteristic of the source frame and a characteristic of an adjacent source frame that resides adjacent to the source frame in the plurality of source frames;
   receiving frame difference data derived from aggregate decoded data by determining, for each decoded frame included in a plurality of decoded frames of the aggregate decoded data, a difference between a characteristic of the decoded frame and a characteristic of an adjacent decoded frame that resides adjacent to the decoded frame in the plurality of decoded frames, wherein the plurality of source frames of the source data corresponds to the plurality of decoded frames of the aggregate decoded data, wherein the aggregate decoded data is generated by decoding aggregate encoded data that is derived from the source data by separately encoding a plurality of chunks of the source data to generate a plurality of encoded chunks of the source data and combining the plurality of encoded chunks of the source data, and wherein each chunk included in the plurality of chunks of the source data is encoded by a separate compute instance included in a plurality of compute instances;
   comparing the frame difference data derived from the source data and the frame difference data derived from the aggregate decoded data to generate a first comparison;
   detecting that an error condition occurred while encoding one or more encoded chunks of the source data included in the plurality of encoded chunks of the source data based on the first comparison; and
   debugging, based on the error condition, an encoding process performed to generate the one or more encoded chunks of source data by one or more compute instances included in the plurality of compute instances.

2. The computer-implemented method of claim 1, wherein detecting that the error condition occurred comprises:
   determining (1) a first total number of source frames associated with the frame difference data derived from the source data, and (2) a second total number of decoded frames associated with the frame difference data derived from the aggregate decoded data, and
   determining that the first total number of source frames differs from the second total number of decoded frames by more than a predetermined threshold.

3. The computer-implemented method of claim 1, wherein the comparing comprises:
   partitioning the frame difference data derived from the source data and the frame difference data derived from the decoded aggregate encode into a plurality of blocks, wherein each block in the plurality of blocks includes a subset of frame difference data derived from the source data and a corresponding subset of frame difference data derived from the decoded aggregate encoded data; and
   for each block, comparing the frame difference data derived from the source data to the frame difference data derived from the decoded aggregate encoded data to determine a phase correlation value for the block.

4. The computer-implemented method of claim 3, wherein detecting that the error condition occurred comprises:
   identifying a first number of blocks, wherein each block included in the first number of blocks has a phase correlation value less than a first predetermined threshold; and
   determining that the first number of blocks is greater than a second predetermined threshold.

5. The computer-implemented method of claim 3, wherein detecting that the error condition occurred comprises:
   for a first block, performing a phase shift operation on the frame difference data derived from the source data;
   for the first block, comparing the shifted frame difference data derived from the source data to the corresponding frame difference data derived from the decoded aggregate encoded data to determine a shifted phase correlation value; and determining that the shifted phase correlation value is greater than a phase correlation value for the first block by at least a first predetermined amount.

6. The computer-implemented method of claim 3, wherein detecting that the error condition occurred comprises:
identifying a scene cut based on the phase correlation values;
identifying a first number of blocks, wherein each block included in the first number of blocks does not immediately precede the scene cut and has a phase correlation value less than a first predetermined threshold; and
determining that the first number of blocks is greater than a second predetermined threshold.

7. The computer-implemented method of claim 3, wherein detecting that the error condition occurred comprises:
identifying a first block having a phase correlation value less than a first predetermined threshold; and
determining that the encoding bit-rate of the aggregate encoded data is greater than a second predetermined threshold.

8. The computer-implemented method of claim 3, wherein detecting that the error condition occurred comprises:
identifying a set of low correlation blocks, wherein each block included in the set of low correlation blocks has a phase correlation value less than a first predetermined threshold;
determining a distribution based on phase correlation values for the set of low correlation blocks;
computing a confidence zone based on the distribution;
identifying a first number of blocks, wherein each block included in the first number of blocks is included in the set of low correlation blocks and has a phase correlation value that is outside the confidence zone; and
determining that the first number of blocks is greater than a second predetermined threshold.

9. The computer-implemented method of claim 8, wherein identifying a first block that has a phase correlation value that is outside the confidence zone comprises applying the Grubbs test to the distribution.

10. One or more non-transitory computer-readable storage media including instructions that, when executed by one or more processing units, cause the one or more processing units to identify errors introduced during encoding by performing the steps of:
receiving frame difference data derived from source data by determining, for each source frame included in a plurality of source frames of the source data, a difference between a characteristic of the source frame and a characteristic of an adjacent source frame that resides adjacent to the source frame in the plurality of source frames;
receiving frame difference data derived from aggregate decoded data by determining, for each decoded frame included in a plurality of decoded frames of the aggregate decoded data, a difference between a characteristic of the decoded frame and a characteristic of an adjacent decoded frame that resides adjacent to the decoded frame in the plurality of decoded frames, wherein the plurality of source frames of the source data corresponds to the plurality of decoded frames of the aggregate decoded data, wherein the aggregate decoded data is generated by decoding aggregate encoded data that is derived from the source data by separately encoding a plurality of chunks of the source data to generate a plurality of encoded chunks of the source data and combining the plurality of encoded chunks of the source data, and wherein each chunk included in the plurality of chunks of the source data is encoded by a separate compute instance included in a plurality of compute instances;
comparing the frame difference data derived from the source data and the frame difference data derived from the aggregate decoded data to generate a first comparison;
detecting that an error condition occurred while encoding one or more encoded chunks of the source data included in the plurality of encoded chunks of the source data based on the first comparison; and
debugging, based on the error condition, an encoding process performed to generate the one or more encoded chunks of source data by one or more compute instances included in the plurality of compute instances.

11. The one or more non-transitory computer-readable storage media of claim 10, wherein detecting that the error condition occurred comprises:
determining(1) a first total number of source frames associated with the frame difference data derived from the source data, and (2) a second total number of decoded frames associated with the frame difference data derived from the aggregate decoded data, and
determining that the first total number of source frames differs from the second total number of decoded frames by more than a predetermined threshold.

12. The one or more non-transitory computer-readable storage media of claim 10, wherein the comparing comprises:
partitioning the frame difference data derived from the source data and the frame difference data derived from the decoded aggregate encode into a plurality of blocks, wherein each block in the plurality of blocks includes a subset of frame difference data derived from the source data and a corresponding subset of frame difference data derived from the decoded aggregate encoded data; and
for each block, comparing the frame difference data derived from the source data to the frame difference data derived from the decoded aggregate encoded data to determine a cross-correlation value for the block.

13. The one or more non-transitory computer-readable storage media of claim 12, wherein detecting that the error condition occurred comprises:
identifying a first number of sequential blocks, wherein each block included in the first number of sequential blocks has a cross-correlation value less than a first predetermined threshold; and
determining that the first number of sequential blocks exceeds a second predetermined threshold.

14. The one or more non-transitory computer-readable storage media of claim 12, wherein detecting that the error condition occurred comprises:
determining that the encoding bit-rate of the aggregate encoded data is greater than a second predetermined threshold;
identifying a first number of blocks, wherein each block included in the first number of blocks has a cross-correlation value less than a first predetermined threshold; and
determining that the first number of blocks is greater than a second predetermined threshold.

15. The one or more non-transitory computer-readable storage media of claim 12, wherein detecting that the error condition occurred comprises:
  identifying a set of low cross-correlation blocks, wherein each block included in the set of low cross-correlation blocks has a cross-correlation value less than a first predetermined threshold;
  applying the Grubbs test to the set of low cross-correlation blocks to identify a first number of blocks; and
  determining that the first number of blocks is greater than a second predetermined threshold.

16. The one or more non-transitory computer-readable storage media of claim 12, wherein detecting that the error condition occurred comprises:
  for a first block, performing a phase shift operation on the frame difference data derived from the source data;
  for the first block, comparing the shifted frame difference data derived from the source data to the corresponding frame difference data derived from the decoded aggregate encoded data to determine a shifted cross-correlation value; and
  determining that the shifted cross-correlation value is greater than a cross-correlation value for the first block by at least a first predetermined amount.

17. The one or more non-transitory computer-readable storage media of claim 12, wherein detecting that the error condition occurred comprises:
  identifying a scene cut based on the cross-correlation values; and
  identifying a first block, wherein the first block does not immediately precede the scene cut and has a cross-correlation value less than a first predetermined threshold.

18. The one or more non-transitory computer-readable storage media of claim 17, wherein identifying the scene cut comprises
  detecting a first source frame that has a frame difference data derived from the source data that exceeds a first threshold; and
  determining that a second source frame that immediately precedes the first source frame has a frame difference data derived from the source data that differs from the frame difference data derived from the source data for the first source frame by at least a second threshold.

19. A system configured to identify errors introduced during encoding, the system comprising:
  a source frame difference data generator configured to receive frame difference data derived from source data by determining, for each source frame included in a plurality of source frames of the source data, a difference between a characteristic of the source frame and a characteristic of an adjacent source frame that resides adjacent to the source frame in the plurality of source frames;
  a parallel encoding engine configured to derive aggregate encoded data from the source data by separately encoding a plurality of chunks of the source data to generate a plurality of encoded chunks of the source data and combining the plurality of encoded chunks of the source data, and wherein each chunk included in the plurality of chunks of the source data is encoded by a separate compute instance included in a plurality of compute instances;
  a verification generator configured to:
    receive frame difference data derived from the aggregate decoded data by determining, for each decoded frame included in a plurality of decoded frames of the aggregate decoded data, a difference between a characteristic of the decoded frame and a characteristic of an adjacent decoded frame that resides adjacent to the decoded frame in the plurality of decoded frames, wherein the plurality of source frames of the source data corresponds to the plurality of decoded frames of the aggregate decoded data, wherein the aggregate decoded data is generated by decoding the aggregate encoded data;
    compare the frame difference data derived from the source data and the frame difference data derived from the aggregate decoded data to a first comparison;
    detect that an error condition occurred while encoding one or more encoded chunks of the source data included in the plurality of encoded chunks of the source data based on the first comparison; and
    debug, based on the error condition, an encoding process performed to generate the one or more encoded chunks of source data by one or more compute instances included in the plurality of compute instances.

20. The system of claim 19, wherein detecting that the error condition occurred comprises:
  determining (1) a first total number of source frames associated with the frame difference data derived from the source data, and (2) a second total number of decoded frames associated with the frame difference data derived from the aggregate decoded data, and
  determining that the first total number of source frames differs from the second total number of decoded frames by more than a predetermined threshold.

* * * * *